United States Patent
Iwase et al.

(10) Patent No.: US 7,015,604 B2
(45) Date of Patent: Mar. 21, 2006

(54) STEPPING MOTOR AND METHOD OF MANUFACTURING STEPPING MOTOR

(75) Inventors: Masato Iwase, Koriyama (JP); Masaaki Takagi, Koriyama (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/831,204

(22) Filed: Apr. 26, 2004

(65) Prior Publication Data

US 2004/0263006 A1    Dec. 30, 2004

(30) Foreign Application Priority Data

Apr. 30, 2003   (JP)   ............... P.2003-125873

(51) Int. Cl.
  *H02K 1/12*   (2006.01)
(52) U.S. Cl. ............... 310/49 R; 310/49 A; 310/257
(58) Field of Classification Search ............. 310/49 R, 310/90, 49 A, 257, 67 R, 47 A
  See application file for complete search history.

(56) References Cited

U.S. PATENT DOCUMENTS

| | | | | |
|---|---|---|---|---|
| 3,197,659 A | * | 7/1965 | Marshall | 310/49 R |
| 3,633,055 A | * | 1/1972 | Maier | 310/156.26 |
| 3,894,256 A | * | 7/1975 | Sholtz | 310/90 |
| 4,185,214 A | * | 1/1980 | Gerber et al. | 310/51 |
| 4,363,984 A | * | 12/1982 | Torii et al. | 310/156.12 |
| 4,438,361 A | * | 3/1984 | Manson | 310/90 |
| 4,480,206 A | * | 10/1984 | Manson | 310/90 |
| 4,480,881 A | * | 11/1984 | Fujimori | 310/90 |
| 4,795,926 A | * | 1/1989 | Someya et al. | 310/90 |
| 4,857,786 A | * | 8/1989 | Nihei et al. | 310/156.38 |
| 5,091,667 A | * | 2/1992 | Tomite | 310/154.26 |
| 5,105,113 A | * | 4/1992 | Ishikura et al. | 310/154.29 |
| 5,117,128 A | * | 5/1992 | Albrecht et al. | 310/191 |
| 5,770,900 A | * | 6/1998 | Sato et al. | 310/49 R |
| 5,945,759 A | * | 8/1999 | Tanaka et al. | 310/90 |
| 6,040,649 A | * | 3/2000 | Horng | 310/91 |
| 6,469,412 B1 | * | 10/2002 | Patarchi | 310/158 |
| 6,717,306 B1 | * | 4/2004 | Kudou et al. | 310/81 |

FOREIGN PATENT DOCUMENTS

| | | |
|---|---|---|
| JP | 2-218072 | 8/1990 |
| JP | 6-98520 | 4/1994 |
| JP | 10-84463 | 3/1998 |

* cited by examiner

*Primary Examiner*—Dang Le
(74) *Attorney, Agent, or Firm*—McGinn IP Law Group, PLLC

(57) ABSTRACT

A stepping motor includes: a rotary shaft; a rotor magnet mounted fixedly on the rotary shaft; a bearing member including a smaller-diameter portion and a larger-diameter portion, and supporting the rotary shaft; and a yoke including a plurality of magnetic pole teeth surrounding an outer circumferential surface of the rotor magnet, and a bottom plate having an opening into which the smaller-diameter portion of the bearing member is inserted. The smaller-diameter portion of the bearing member is fitted in the opening of the bottom plate and clamped radially outward.

17 Claims, 8 Drawing Sheets

STEPPING MOTOR AND METHOD OF MANUFACTURING STEPPING MOTOR

BACKGROUND OF THE INVENTION

The present invention relates to a stepping motor and a method of manufacturing the stepping motor.

In a related art stepping motor, a stator is bonded to an inner surface of a motor case, and a bearing is fixed to the motor case. (Refer to, for example, the patent documents 1 to 3). FIG. 11 is a sectional view of such a related art stepping motor. Referring to FIG. 11, a magnetic field is generated in magnetic pole teeth of yokes 104a, 104b, 108a, 108b owing to a pulse voltage applied to coils 105a, 105b wounded around a rotor magnet 107 coaxially therewith. A driving force is generated owing to a magnetic field of the multi-pole magnetized rotor magnet 107, and a shaft 101 and rotor magnet 107 are rotated in a body.

The yoke 104a includes a motor fixing stay 103 secured thereto, into which a bearing member 102a is press-fitted firmly. On the other hand, the yoke 104b includes a disc type bearing fixing member 106 secured thereto. A bearing member 102b is press-fitted into the bearing fixing member 106. The shaft 101 is supported by these bearing members 102a, 102b.

Patent Document 1
JP-A-06-098520

Patent Document 2
JP-A-10-084663

Patent Document 3
JP-A-02-218072

In the construction of the above-described related art stepping motor, the bearing fixing member 106 is used only for fixing the bearing member thereto, and a total length of the motor is long by a length corresponding to the thickness of this bearing fixing member 106. In other words, a ratio of the length of a magnetic circuit to a total length of the motor is small due to the existence of the bearing fixing member 106. The number of parts increases correspondingly to the provision of the bearing fixing member. Moreover, since the bearing fixing member 106 is secured to the yoke 104b, the man-hour increases, and this hampered the improvement of the productivity of the motor.

In order to solve these problems, the use of a method of fixing the bearing member 102b directly to the yoke 104b is conceivable. However, in a structure in which the bearing member 102 is simply press-fitted into the yoke 104b, a high fitting accuracy is demanded between the bearing member 102 and yoke 104b. Further, a high processing accuracy is demanded with respect to the bearing member and yoke for the purpose of centering the shaft. This causes the improvement of the productivity of the motor as a whole to be hampered. In the fixing method using a press-fitting operation, the bearing member is liable to be loosened due to an impact and heat, and the possibility of occurrence of slip-off of the bearing member is comparatively high. Therefore, this method has problems concerning the durability and reliability of the stepping motor.

In a related art method of simply fixing a bearing member to the yoke, an opening of the yoke cannot be sealed, so that dust readily enters the interior of the motor. Therefore, this method also has problems concerning the durability and reliability of the stepping motor.

SUMMARY OF THE INVENTION

The present invention has been made so as to solve the problems of the related art stepping motor, and an object of the invention is to provide a stepping motor capable of omitting the bearing fixing member and thereby miniaturizing the stepping motor, and having high productivity, durability, reliability and performance and a method of manufacturing the stepping motor.

Another object of the present invention is to provide a stepping motor capable of omitting the bearing fixing member and thereby miniaturizing the stepping motor, capable of preventing the entry of dust into the interior of the motor, and having high durability, reliability and performance.

In order to solve the aforesaid object, the invention is characterized by having the following arrangement.

(1) A stepping motor comprising:
   a rotary shaft;
   a rotor magnet mounted fixedly on the rotary shaft;
   a bearing member including a smaller-diameter portion and a larger-diameter portion, and supporting the rotary shaft; and
   a yoke including a plurality of magnetic pole teeth surrounding an outer circumferential surface of the rotor magnet, and a bottom plate having an opening into which the smaller-diameter portion of the bearing member is inserted,
   wherein the smaller-diameter portion of the bearing member is fitted in the opening of the bottom plate and clamped radially outward.

(2) The stepping motor according to (1), wherein the smaller-diameter portion has edge sections among the magnetic pole teeth for clamping the bottom plate.

(3) The stepping motor according to (1), wherein the bottom plate includes tongue sections held between the larger-diameter portion and the clamped smaller-diameter portion.

(4) The stepping motor according to (1), wherein the larger-diameter portion has a size large enough to seal the opening of the yoke therewith.

(5) The stepping motor according to (1), wherein the bearing member is an impregnation bearing.

(6) The stepping motor according to (1), wherein the bearing member includes a ball bearing and a bearing holder in which the ball bearing is fitted.

(7) The stepping motor according to (1), wherein
   an inner diameter of the opening is larger than an outer diameter of the smaller-diameter portion,
   a thickness of the bottom plate is smaller than that of the smaller-diameter portion.

(8) The stepping motor according to (7), wherein an edge of the smaller-diameter portion is deformed radially outward so that the bottom plate is held between the smaller-diameter portion and the larger diameter portion.

(9) A stepping motor comprising:
   a rotary shaft;
   a rotor magnet mounted fixedly on the rotary shaft;
   a bearing member including a smaller-diameter portion and a larger-diameter portion, and supporting the rotary shaft; and
   a yoke including a plurality of magnetic pole teeth surrounding an outer circumferential surface of the rotor magnet, and a bottom plate having an opening into which the smaller-diameter portion of the bearing member is inserted,
   wherein the larger-diameter portion seals the opening with the smaller-diameter portion inserted therein.

(10) A method of manufacturing a stepping motor for supporting a rotary shaft including a bearing member including a smaller-diameter portion and a larger-diameter portion, and a yoke including a plurality of magnetic pole teeth surrounding a rotor magnet and a bottom plate having an opening, the method comprising the steps of:

inserting the smaller-diameter portion into the opening; and deforming an edge of the smaller-diameter potion so that the bottom plate is held between the deformed smaller-diameter portion and the larger diameter portion.

DETAILED DESCRIPTION OF PREFERRED EMBODIMENTS

Preferred modes of embodiment of this invention will now be described by way of examples with reference to the drawings. Unless any specific statement is given, the relative arrangement and numerical values of the constituent elements of these modes of embodiment do not mean that the scope of the invention is limited to them only.

First Embodiment

Figure 1:
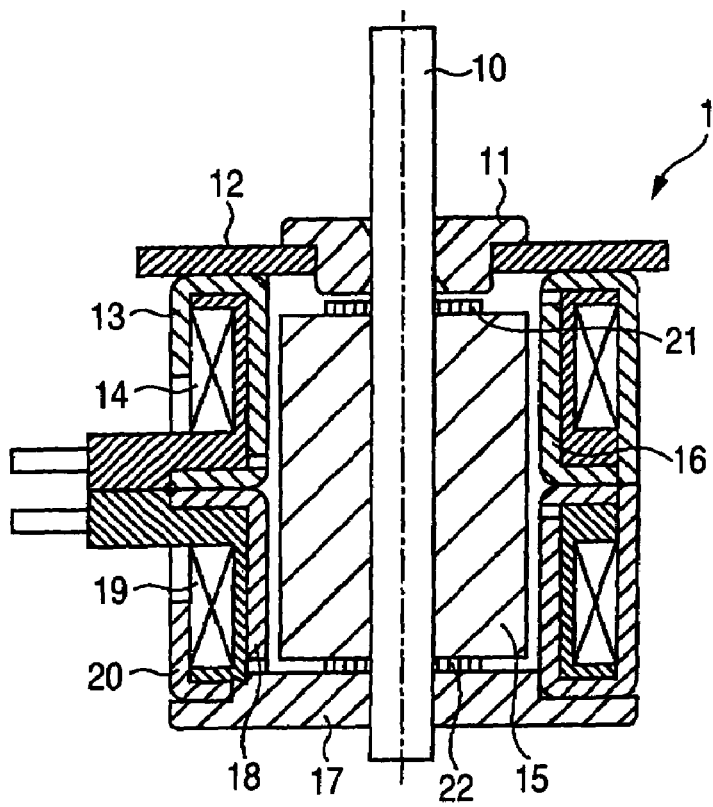
FIG. 1 is a sectional view of a stepping motor according to a first embodiment of the present invention.

FIG. 1 is a longitudinal sectional view of a stepping motor 1 according to a first embodiment of the present invention. Referring to FIG. 1, the stepping motor 1 includes a first stator formed by holding a coil (bobbin) 14 between a yoke 13 and a yoke 16 in a vertical direction in the drawing, and a second stator formed by holding a coil 19 between a yoke 18 and a yoke 20 in the vertical direction in the drawing. The first stator and second stator are arranged continuously to form a two-phase magnetic field.

A rotor magnet 15, the outer circumference of which is multi-pole magnetized so as to be opposed to magnetic pole teeth of the yokes 13, 16, 18, 20 is mounted fixedly on a shaft 10, and receives a magnetic force from the magnetic pole teeth, the rotor magnet being thereby rotated with the relative shaft 10.

To an upper surface of the yoke 13, a motor fixing stay 12 is secured, and a bearing member 11 is clamped to the motor fixing stay 12.

A bearing member 17 is fitted directly and clamped to a bottom portion of the yoke 20.

Spacers 21, 22 are provided between the bearing member 11 and the rotor magnet 15 and between the rotor magnet 15 and bearing 17, respectively.

Figure 2:
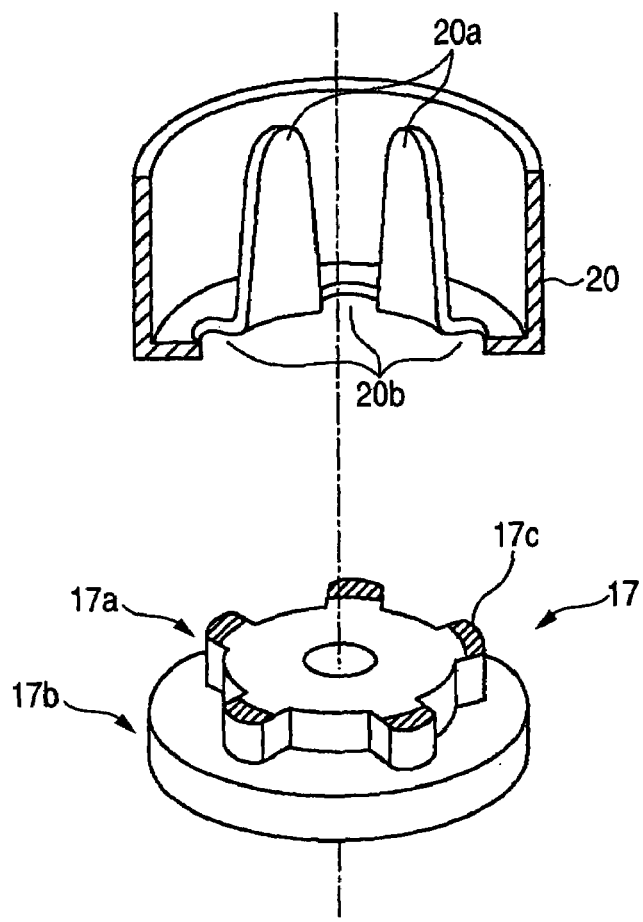
FIG. 2 is an assembly drawing of a yoke and a bearing member in the first embodiment of the present invention.

FIG. 2 is a drawing showing a process of combining the yoke 20 and bearing member 17 with each other. Referring to FIG. 2, the yoke 20 is shown in partially cutaway perspective. As shown in FIG. 2, the yoke 20 is provided with a plurality of magnetic pole teeth 20a, between which recesses 20b for escaping stress generated when the magnetic pole teeth 20a are bent or drawn are formed. In this embodiment, the yoke 20 is provided with five magnetic pole teeth 20a and five recesses 20b by way of examples. However, the present invention is not limited to this structure. Other number of magnetic pole teeth 20a and recesses 20b may also be provided.

The bearing member 17 is a two-stage disc type member having at the center thereof a hole into which the shaft 10 is inserted, and provided with a smaller-diameter portion 17a and a larger-diameter portion 17b. The bearing member 17 is an integral part, and made of an impregnation member capable of being impregnated with a lubricant. In this embodiment, a bearing made of an impregnation member shall be called an impregnation bearing.

The smaller-diameter portion 17a is provided in the positions thereon which correspond to the recesses 20b of the yoke 20 with correspondingly shaped edges 17c to be clamped. Since five recesses 20b are provided in this embodiment, five edges 17c are provided.

The inner diameter of each recess 20b is set slightly larger than the outer diameter of each edge 17c of the bearing member 17. The thickness of a bottom plate of the yoke is set smaller than that of the smaller-diameter portion 17a.

Figure 3:
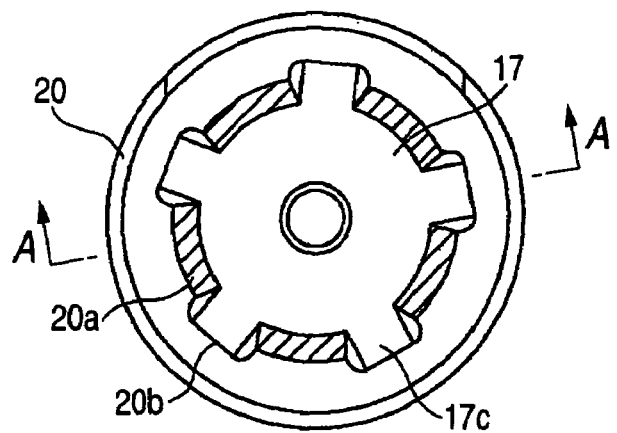
FIG. 3 is a top view of the yoke and bearing member in the first embodiment of the present invention.

FIG. 3 is a drawing taken from the upper side of FIG. 2 and showing the condition of the bearing member 17 fitted in the yoke 20. As shown in FIG. 3, the edges 17c are inserted into the recesses 20b of the yoke 20. When the edges 17c in this condition is clamped by using a jig, a bottom portion (especially, the recesses 20b) is held between the edges 17c and larger-diameter portion 17b, and the bearing member 17 is fixed firmly to the yoke 20. The smaller-diameter portion 17a of the bearing member 17 is fitted in the recesses 20b, which are provided as opening-defining recesses of the yoke 20, with accuracy high enough to attain the centering of the shaft 10. However, since the engagement of the yoke 20 and bearing member 17 with each other in this embodiment is based on a clamping-fixing operation, it is possible to loosen the allowance to a certain extent as compared with that in a case where the smaller-diameter portion 17a is press-fitted into the yoke 20.

Figure 4A:
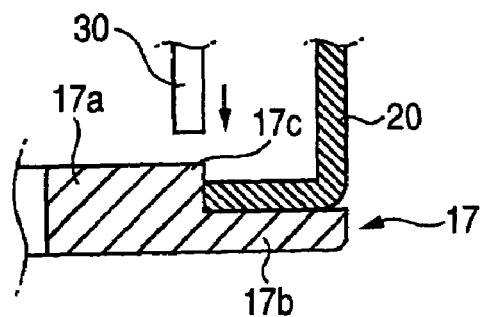
FIGS. 4A and 4B are explanatory drawings describing the clamping to each other of the yoke and bearing member in the first embodiment of the present invention.
Figure 4B:
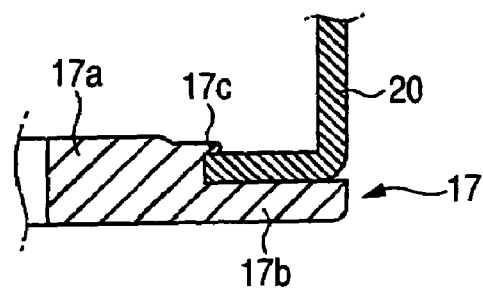

FIGS. 4A and 4B are drawings describing the condition of the clamping of the bearing member 17, and showing a part of a cross-section taken along the line A—A passing the center of the bearing member of FIG. 3. When an upper surface of the smaller-diameter portion 17a is pressed by a jig 30 from the upper side of FIG. 4A with the smaller-diameter portion 17a of the bearing member 17 being inserted into the openings of the yoke 20 as shown in the drawing, the edges 17c is deformed radially outward and clamped, and the bottom plate of the yoke 30 is held between the clamped smaller-diameter portion 17a and larger-diameter portion 17b.

The larger-diameter portion 17b has a size large enough to seal the opening of the yoke 20, and prevents the entry of foreign matter into the interior of the motor.

Since this embodiment described above is formed so that the bearing member is fixed directly to the yoke, such a bearing fixing member as is used in a related art stepping motor becomes unnecessary. This enables the number of parts and a total length of the motor to be reduced, and in its turn the length of the magnetic circuit with respect to the total length of the motor to be increased. Since the bearing member is clamp-fixed to the yoke, the processing accuracy of the bearing member and yoke can be set comparatively low. The embodiment can also prevent the bearing member from slipping off from the yoke due to an impact and heat.

Second Embodiment

Figure 5A:
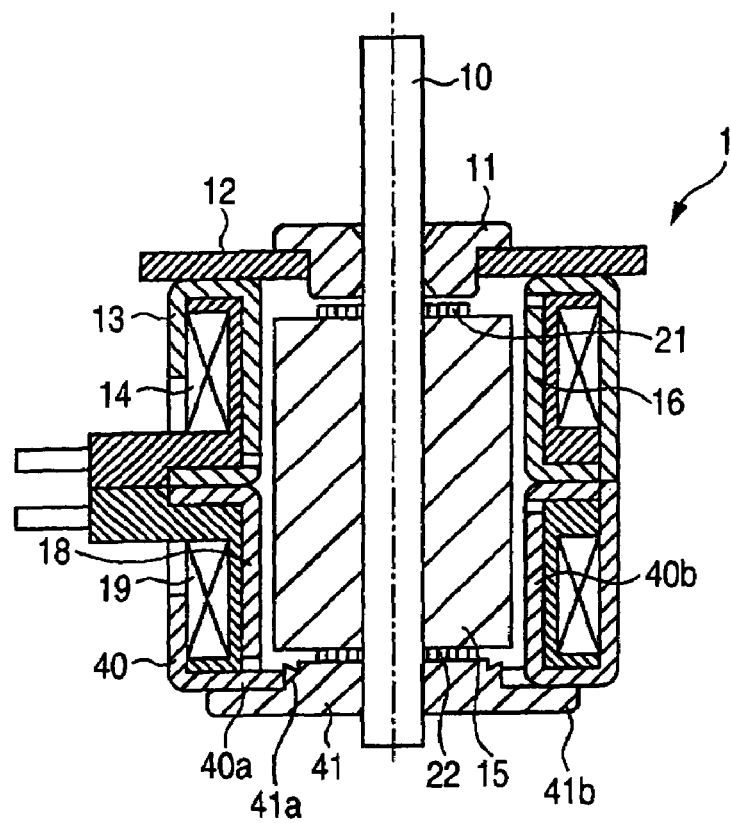
FIG. 5A is a sectional view of a stepping motor and FIG. 5B is a perspective view of a lower bearing member according to a second embodiment of the present invention.

The stepping motor as a second embodiment of the present invention will now be described. FIG. 5A is a longitudinal sectional view of the stepping motor of this embodiment. The stepping motor of this embodiment is different from the above-described first embodiment in the shapes only of the lowermost yoke 40 and a lower bearing member 41. Therefore, in the second embodiment, the constituent parts identical with those of the first embodiment are designated by the same reference numerals, and a description of such parts will be omitted.

Figure 5B:
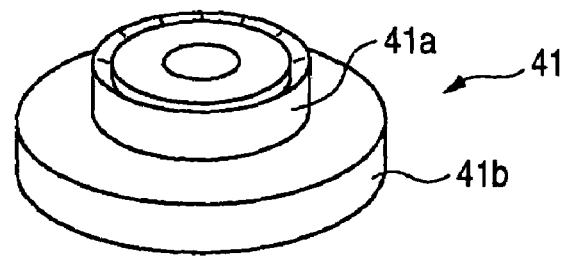

The bearing member 41 is a two-stage disc type member having in the center thereof a hole through which a shaft 10 is inserted, and provided with a smaller-diameter portion and a larger-diameter portion 41b. The smaller-diameter portion 41a is not provided with such a shaped edges 17c as are provided in the first embodiment but formed to a simple cylindrical shape. FIG. 5B is a perspective view of the bearing member 41. As shown in the drawing, the smaller-diameter portion 41a is provided in an upper surface thereof with a groove to be clamped which extends along an outer circumference thereof.

On the other hand, the yoke 40 is provided in the parts of a bottom portion thereof which are among magnetic pole teeth 40b with radially inwardly projecting tongue sections 40a. Since the smaller-diameter portion 41a of the bearing member 41 is clamped to the tongue sections 40a of the yoke 40, the bearing member 41 is necessarily fixed to the yoke 40 which serves also as a motor case 40, so that the shaft 10 can be supported in the center of the motor.

Figure 6:
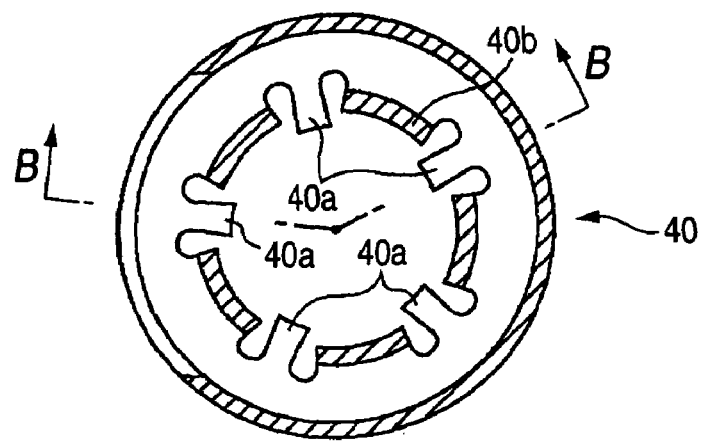
FIG. 6 is a sectional view of a yoke in the second embodiment of the present invention.
Figure 7:
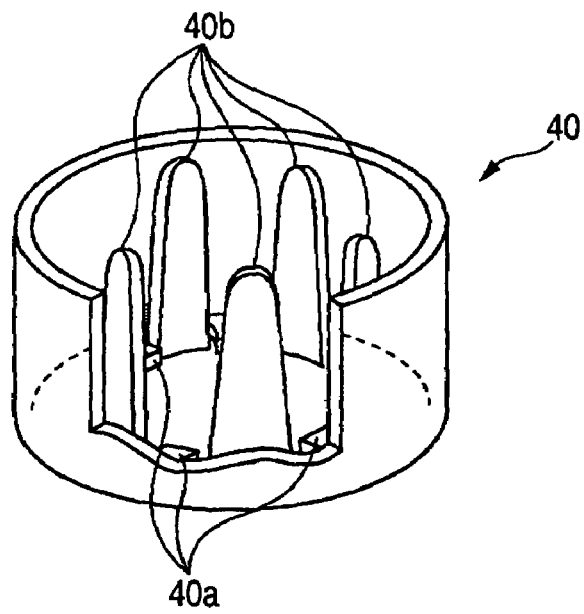
FIG. 7 is a perspective view of the yoke in the second embodiment of the present invention.

FIG. 6 is a sectional view of the yoke 40 alone taken out from the stepping motor, which drawing is perpendicularly taken with respect to the shaft at the portion of the yoke in which the magnetic pole teeth 40b exist. This sectional view is a drawing taken from the upper side of FIG. 5. FIG. 7 is a partially cutaway view in perspective of the yoke 40.

In this embodiment, a yoke 40 having five tongue sections 40a between five magnetic pole teeth 40b is shown by way of example. However, the present invention is not limited to this structure. The number of the magnetic pole teeth and that of the tongue sections may be not larger than four, and not smaller than six. The number of the magnetic pole teeth and that of the tongues may be different from each other.

Figure 8A:
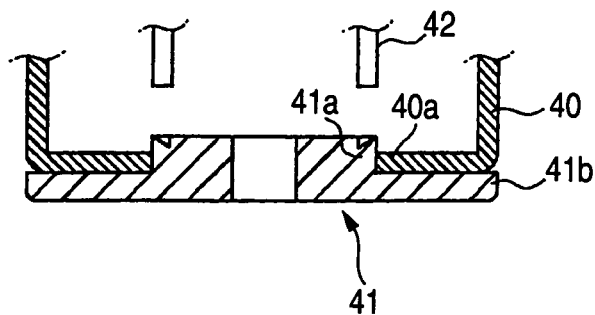
FIGS. 8A and 8B are explanatory drawings for describing the clamping to each other of the yoke and bearing in the second embodiment of the present invention.
Figure 8B:
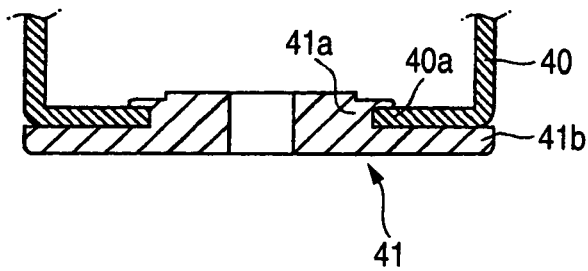

FIGS. 8A and 8B are sectional views taken along the line B—B in FIG. 6, and showing the condition of the bearing member 41 being fitted into the tongue sections 40a. As shown in FIG. 8A, the inner diameter of each tongue section 40a is set slightly larger than the outer diameter of the smaller-diameter portion 41a of the bearing member 41. The thickness of each tongue section 40a is set smaller than that of the smaller-diameter portion 41a. Owing to this structure, when the smaller-diameter portion 41a of the bearing member 41 is inserted into the opening of the yoke 40 with the upper surface of the smaller diameter portion 41a then pressed by the jig 42 as shown in FIG. 8A, the bearing member 41 is clamp-fixed to the yoke 40 as shown in FIG. 8B.

According to this embodiment described above, the effect identical with that obtained in the above-described first embodiment can be obtained.

Third Embodiment

A third embodiment of the present invention will now be described. The stepping motor of this embodiment is different from those of the above-described first and second modes of embodiment in that a bearing member is formed by a combination of a general-purpose bearing and a bearing holder.

Figure 9:
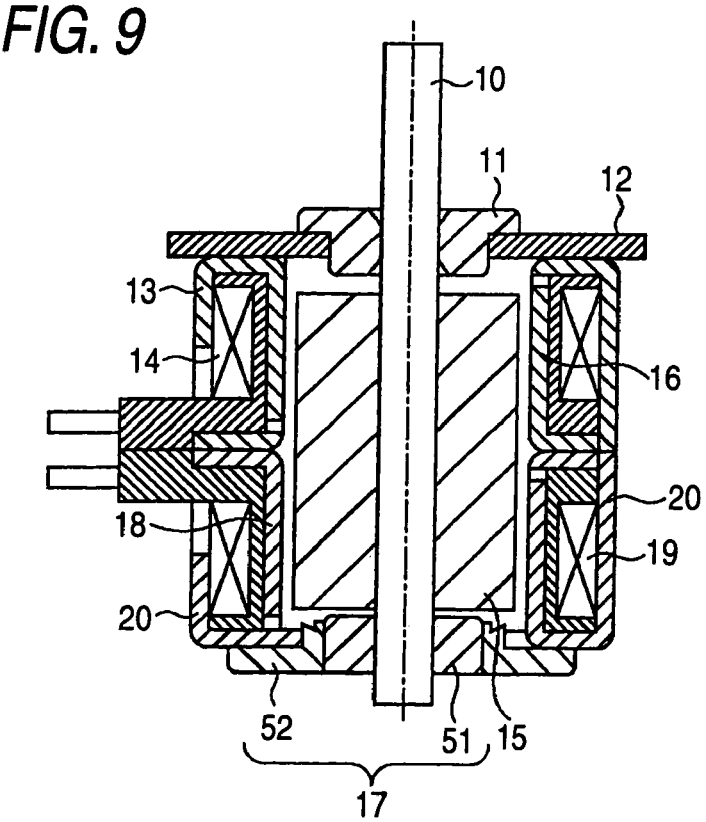
FIG. 9 is a sectional view of a stepping motor as a third embodiment of the present invention.

FIG. 9 is a sectional view of a stepping motor according to the third embodiment. Referring to FIG. 9, this embodiment is different from the first embodiment in that a bearing member 17 is formed by a general-purpose slide bearing 51 and a bearing holder 52.

Since the construction of the other parts is identical with that of the corresponding parts of the first embodiment, the same parts will be designated by the same reference numerals, and a description thereof will be omitted.

The slide bearing 51 is press-fitted in the bearing holder 52 before the motor is assembled, and then fitted as a solid bearing member 17 into a yoke 20 and clamp-fixed.

According to this embodiment, it becomes possible to use a general-purpose slide bearing 51. This embodiment can obtain the effects identical with those of the above-described first embodiment. In addition to this, the third embodiment enables the productivity of the motor to be more improved. When an impregnation bearing is used as the slide bearing 51, it produces preferable effects with respect to the maintenance and durability of the motor.

Figure 10:
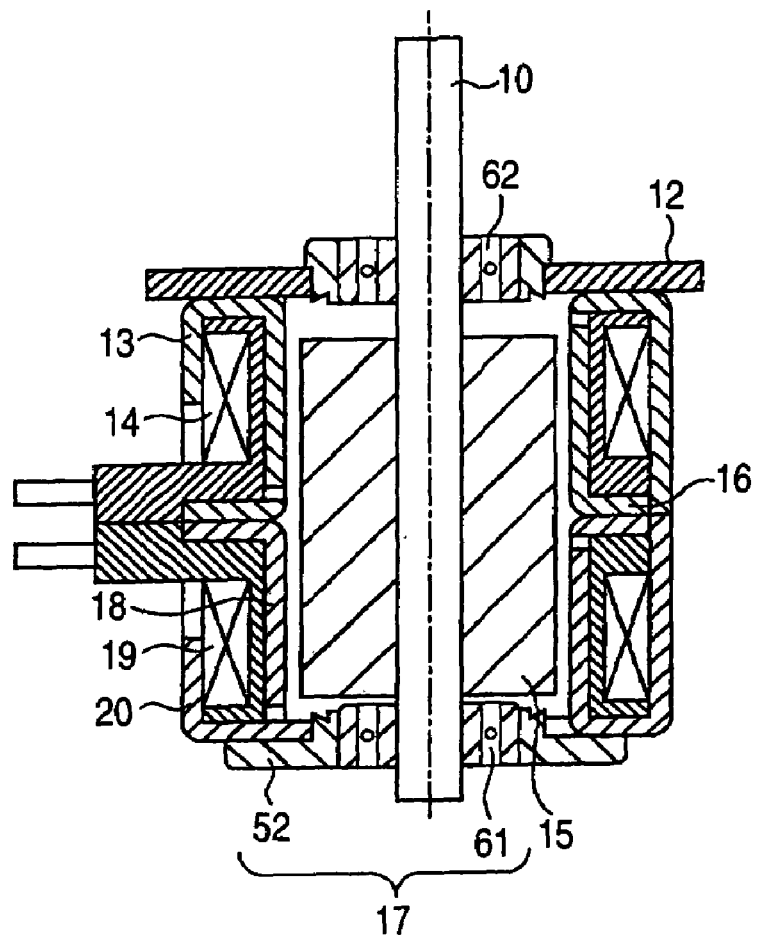
FIG. 10 is a sectional view of the stepping motor as the third embodiment of the present invention.
Figure 11:
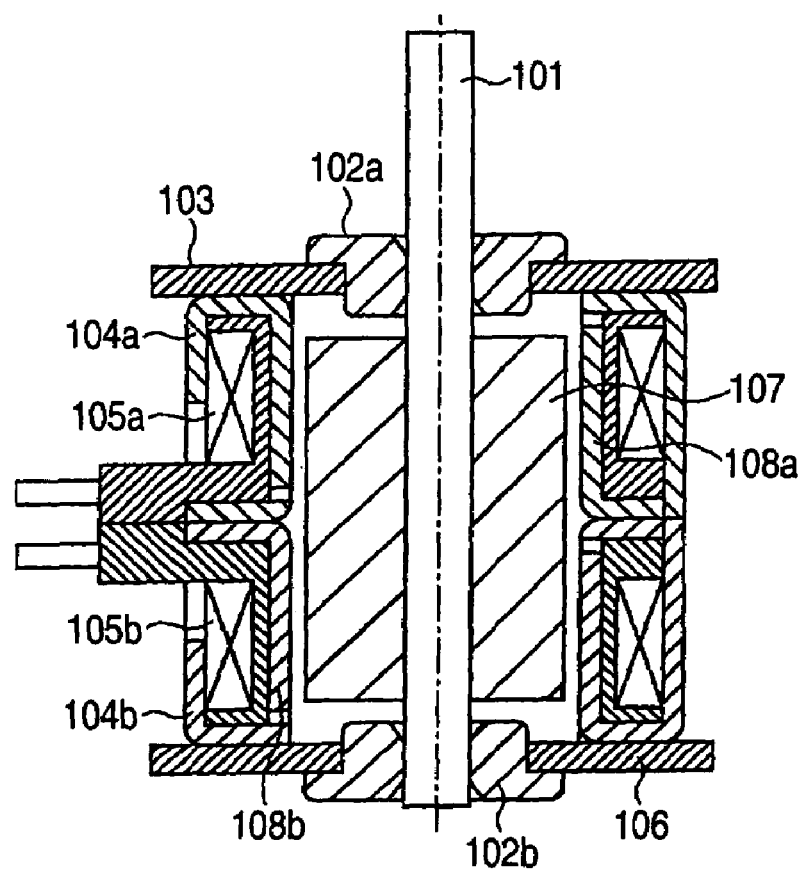
FIG. 11 is a sectional view of a related art stepping motor.

As shown in FIG. 10, the bearing member 17 may be formed by press-fitting firmly a ball bearing 61 into the bearing holder 52. In this case, when a bearing member at the other end of the motor is formed to a structure using a ball bearing 62 as well, the motor structure becomes well balanced.

When this structure is employed, a motor having bearings of higher accuracy and durability in addition to the effects of the above-described first embodiment can be provided.

Fourth Embodiment

In the above-described embodiment, the bearing member and yoke are clamp-fixed, and an opening of a yoke is sealed with a larger-diameter portion of the bearing member. However, it is needless to say that the opening of the yoke is sealed with the larger-diameter portion of the bearing member even when the bearing member and yoke are not clamp-fixed.

Therefore, according to the present invention, a structure as the fourth embodiment thereof having a bearing member engaged with the opening of the yoke by a method other than the clamp-fixing method, and a larger-diameter portion of the bearing sealing the opening of the yoke can be employed. Owing to this structure, the entry of foreign matter into the interior of the motor can be prevented in this embodiment.

According to the present invention, a high-performance stepping motor can be provided.

What is claimed is:

1. A stepping motor comprising:
   a rotary shaft;
   a rotor magnet mounted fixedly on the rotary shaft;

a bearing member comprising a smaller-diameter portion
and a larger-diameter portion, and supporting the rotary
shaft; and a yoke comprising a plurality of magnetic pole teeth
surrounding an outer circumferential surface of the
rotor magnet, and a bottom plate having an opening
into which the smaller-diameter portion of the bearing
member is inserted, wherein the smaller-diameter portion of the bearing member is fitted in the opening of the bottom plate and clamped radially outward such that said smaller-diameter portion axially clamps said bottom plate against said larger-diameter portion.

2. The stepping motor according to claim 1, wherein the smaller-diameter portion comprises edge sections among the magnetic pole teeth for clamping the bottom plate.

3. The stepping motor according to claim 1, wherein the bottom plate comprises tongue sections held between the larger-diameter portion and the clamped smaller-diameter portion.

4. The stepping motor according to claim 1, wherein the larger-diameter portion has a size large enough to seal the opening of the yoke therewith.

5. The stepping motor according to claim 1, wherein the bearing member comprises an impregnation bearing.

6. The stepping motor according to claim 1, wherein the bearing member comprises a ball bearing and a bearing holder in which the ball bearing is fitted.

7. The stepping motor according to claim 1, wherein
an inner diameter of the opening is larger than an outer diameter of the smaller-diameter portion,
a thickness of the bottom plate is smaller than that of the smaller-diameter portion.

8. The stepping motor according to claim 7, wherein an edge of the smaller-diameter portion is deformed radially outward so that the bottom plate is held between the smaller-diameter portion and the larger-diameter portion.

9. A method of manufacturing the stepping motor of claim 1, the method comprising:
inserting the smaller-diameter portion into the opening; and
deforming an edge of the smaller-diameter potion so that the bottom plate is held between the deformed smaller-diameter portion and the larger diameter portion.

10. The motor of claim 1, wherein said smaller-diameter portion is clamped radially outward by a clamping-fixing operation.

11. The motor of claim 10, wherein said clamping-fixing operation uses a jig.

12. The motor of claim 1, wherein the smaller-diameter portion of the bearing member is fitted directly in the opening of the bottom plate of the yoke.

13. The motor of claim 1, wherein the bottom plate of the yoke is clamped between said smaller-diameter portion and said larger-diameter portion of the bearing member.

14. The motor of claim 1, wherein the smaller-diameter portion and the larger-diameter portion of the bearing member are integrally-formed.

15. The motor of claim 1, wherein said rotor magnet comprises multiple poles that are opposed to the plurality of magnetic pole teeth of the yoke.

16. The motor of claim 1, wherein the bearing member comprises:
a general-purpose bearing; and
a bearing holder receiving the general-purpose bearing in an opening.

17. A stepping motor comprising:
a rotary shaft;
a rotor magnet mounted fixedly on the rotary shaft;
a bearing member comprising a smaller-diameter portion and a larger-diameter portion, and supporting the rotary shaft; and
a yoke comprising a plurality of magnetic pole teeth surrounding an outer circumferential surface of the rotor magnet, and a bottom plate having an opening into which the smaller-diameter portion of the bearing member is inserted,
wherein the larger-diameter portion seals the opening with the smaller-diameter portion inserted therein, and
wherein the smaller-diameter portion is clamped radially outward onto the yoke such that said smaller-diameter portion axially clamps said bottom plate against said larger-diameter portion.

* * * * *